UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

BORON-CARBON ALLOY.

1,019,393. Specification of Letters Patent. Patented Mar. 5, 1912.

No Drawing. Application filed October 27, 1909. Serial No. 524,950.

*To all whom it may concern:*

Be it known that I, EZECHIEL WEINTRAUB, a citizen of the United States, residing at Lynn, county of Essex, State of Massachusetts, have invented certain new and useful Improvements in Boron-Carbon Alloys, of which the following is a specification.

My present invention involves a method of reducing boron from its compounds and the production of bodies consisting of boron associated with small amounts of another material, such as carbon, silicon, magnesium or aluminum.

In various co-pending applications filed by me—for example, Serial Number 346,253, on which Patent 997,879 has been issued to me and Serial Number 524,939, filed October 27, 1909—I have described the production of pure fused boron and the application of the same to various useful purposes in the arts. As described by me in these applications, pure fused boron is a fair conductor of electricity and has an enormous negative temperature resistance coefficient. The peculiar properties of boron can be utilized in various applications in the arts, as for example, in pyrometers, wireless telegraphy and as a material for dies, jewels and drills. In some cases, the boron may be associated to advantage with a small amount of another element, such as carbon, silicon, magnesium, aluminum, etc. The addition of a small amount of carbon increases the initial conductivity of the boron and lowers its extreme negative temperature resistance coefficient to an extent depending upon the amount of carbon added. For example, a few tenths of a per cent. of carbon may vary the resistance ten-fold. In a similar manner the presence of a small amount of carbon will modify the wear-resisting qualities of the boron when used as a bearing or die.

I desire in my present application to claim as new, a product consisting of boron associated with certain amounts of the other elements above mentioned. The boron fusion is produced in massive form such as a stick or rod by various methods, examples of which will be described.

According to one method of making boron containing a small percentage of carbon, a carbon filament is heated to incandescence in a mixture of vaporized boron chlorid and hydrogen, thereby depositing pure boron on the surface of the filament. If boron containing a small percentage of carbon is desired, the deposition is continued until a relatively thick rod of boron has been formed. During this process, especially if the temperature is raised considerably, the carbon diffuses through the mass of boron. If a perfectly homogeneous product is desired, the mass is fused down in an arc to form dense bodies of boron chemically united with carbon by methods described in my co-pending application Serial No. 524,947. As the carbon filament has a very small mass, and the deposit of boron can be made quite thick if desired, the percentage of carbon in the final product may be made practically as small as desired. If it is desired to produce thick rods with a higher percentage of carbon, the carbon is deposited simultaneously with the boron by adding to the mixture of boron chlorid and hydrogen a vaporized carbon compound, such as gasolene or carbon tetrachlorid. The actual proportions used depend, of course, upon the amount of carbon desired in the final product. I find that boron chlorid and gasolene are completely miscible, and therefore can be mixed in liquid form and vaporized at the desired rate either by dropping into a vessel which is somewhat heated, carrying the vapor off with a stream of hydrogen, or by merely passing the hydrogen gas over the liquid mixture.

The method above described is claimed in my divisional application, Serial No. 585,390, filed October 5, 1910.

According to another process of manufacture, pure boron is first produced by passing a mixture of boron chlorid and hydrogen through a high voltage alternating current arc maintained between water-cooled copper electrodes. The reduced boron is driven out of the arc by the action of the arc blast, and some of it fused on the ends of the electrodes, and the rest of it is thrown out as a powder on the walls of the arc chamber. The boron in powdered form is mixed with the desired amount of carbon in the form of powdered graphite, or is mixed with powdered silicon, magnesium or aluminum, is then compressed into sticks, and is then fused in a high potential arc operating in hydrogen, using the sticks as electrodes.

Both the above process of reducing boron from its chlorid and the process of fusing it in a high potential arc are disclosed in my co-pending applications Serial Nos. 524,939, 524,947 respectively of even date.

According to still another form of manufacture, an excess of boric anhydrid is reduced with magnesium at a temperature of at least 1300 degrees C., but preferably higher. The resulting product is a brownish powder containing boron and oxygen, and probably is a suboxid of boron. It is pressed into stick form, and is heated to fusion in a vacuum furnace of the Arsem type shown in U. S. Patent #785,535, containing a graphite heater. As it is necessary to run the heater at a temperature of about 2500 degrees C., a small amount of carbon is introduced into the fused boron, as carbon vapor exists at this temperature in the furnace. If it is desired to introduce a larger amount of carbon than is obtainable by this fusion, the desired additional amount can be mixed with the powdered suboxid of boron before introducing the same into the furnace. This method is claimed in application, Serial No. 585,389, filed October 5, 1910, as a division of my application, Serial No. 524,941, filed Oct. 27, 1909.

If it is desired to produce as a final product fused boron containing a small amount of magnesium, I can proceed in the following manner: The reaction between boric anhydrid, $B_2O_3$, and magnesium is carried on under such conditions that boron combined with magnesium is produced as by using boric anhydrid and magnesium in theoretical amounts and carrying out the reaction at a relatively low temperature; that is, below 300° C. The product is then fused in a vacuum furnace. A very small amount of magnesium remains in the product.

While the content of carbon or other element in my new product is usually only a few per cent., I desire to include materials containing up to 15 per cent. of carbon or other elements.

What I claim as new and desire to secure by Letters Patent of the United States, is,—

1. As a composition of matter, boron chemically combined with carbon only, said carbon being present in an appreciable quantity less than 15%.

2. As a composition of matter, a dense fusion consisting of boron associated with other material, the material other than boron aggregating less than 15 per cent.

3. As a composition of matter, fused boron associated only with a small amount of carbon.

4. As a composition of matter, a dense fusion of boron in massive form containing chemically combined therewith less than 15 per cent. of another element.

In witness whereof, I have hereunto set my hand this twenty-sixth day of October, 1909.

EZECHIEL WEINTRAUB.

Witnesses:
JOHN A. MCMANUS, Jr.,
CHARLES A. BARNARD.